United States Patent [19]
Klinger et al.

[11] 3,855,866

[45] Dec. 24, 1974

[54] THERMOMETER READOUT MEANS

[75] Inventors: Josef F. Klinger; John Mark Terrill, both of Wilmette, Ill.

[73] Assignee: Thermex, Inc., Chicago, Ill.

[22] Filed: July 6, 1972

[21] Appl. No.: 269,501

[52] U.S. Cl. ............................................... 73/372
[51] Int. Cl. ........................................... G01k 1/06
[58] Field of Search ............................ 73/372, 371

[56] References Cited
UNITED STATES PATENTS

| | | | |
|---|---|---|---|
| 1,860,986 | 5/1932 | Boyce | 73/372 |
| 2,011,945 | 8/1935 | Mathi | 73/372 X |
| 2,351,455 | 6/1944 | Pratesi | 73/372 |
| 2,389,282 | 11/1945 | Stegeman | 73/372 X |
| 2,712,237 | 7/1955 | Margolis | 73/372 X |
| 3,218,861 | 11/1965 | Moore et al. | 73/371 |

FOREIGN PATENTS OR APPLICATIONS

| 492,329 | 3/1954 | Italy | 73/372 |
|---|---|---|---|

*Primary Examiner*—Richard C. Queisser
*Assistant Examiner*—Daniel M. Yasich
*Attorney, Agent, or Firm*—Hofgren, Wegner, Allen, Stellman & McCord

[57] ABSTRACT

A readout device for use with a thermometer for facilitating determination of the thermometer reading and also to retain the determined indication notwithstanding a subsequent change in the indicator reading. The readout means may define a magnifying lens for facilitating the readout and includes resilient gripping means for retaining the readout means adjustably on the thermometer stem. The readout means may be adjusted while the thermometer is in the patient's body orifice. The thermometer includes a metal bulb secured to one end of the stem to provide a sealed connection therebetween.

13 Claims, 4 Drawing Figures

PATENTED DEC 24 1974 3,855,866

THERMOMETER READOUT MEANS

BACKGROUND OF THE INVENTION

1. Field of the Invention

This invention relates to thermometers and in particular to means for facilitating readout of the thermometer.

2. Description of the Prior Art

In one form of conventional thermometer, such as a clinical thermometer, a liquid indicator is provided in a reservoir bulb to expand therefrom through a capillary bore in an elongated stem. A scale marking is provided on the stem permitting the user to read the temperature sensed by the thermometer by observing the top of the indicator liquid column relative to the scale.

A problem arises in the use of such thermometers in that the liquid indicator tends to contract upon withdrawal from the patient's body orifice so that the top of the indicator liquid column may drop appreciably between the time the thermometer is in the body orifice and the time the reading is made. To overcome this problem, constrictions have been placed in the capillary bore tending to decrease the rate of contraction of the liquid indicator. Further, in certain thermometers, devices have been incorporated for maintaining the top of the liquid indicator column at the sensed maximum temperature. Another problem in such conventional thermometers is the difficulty of reading the small scale markings and viewing the top of the indicator column.

SUMMARY OF THE INVENTION

The present invention comprehends an improved readout means for use with such thermometers facilitating determination of the temperature and providing a retained indication thereof notwithstanding a change in the level in the top of the indicator column. More specifically, the invention comprehends providing a movable element on the thermometer stem which is adjustably positionable to have a reference indicium thereon aligned accurately with the top of the indicator liquid column. The movable element further defines a magnifying means for facilitating reading of the sensed temperature. Still further, the magnifying means effectively defines means for facilitating manual movement of the movable means on the thermometer stem.

The movable element comprises means for resiliently embracing the thermometer stem so as to provide a frictional retention thereof in the adjusted position.

The thermometer may be retained in the patient's mouth or rectum while the movable indicator element is adjustably positioned on the stem. The bulb is positively secured to the thermometer stem to effectively preclude separation therebetween where the bulb is held by the patient's body orifice while the movable indicator element is slid outwardly along the stem.

The thermometer readout means of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
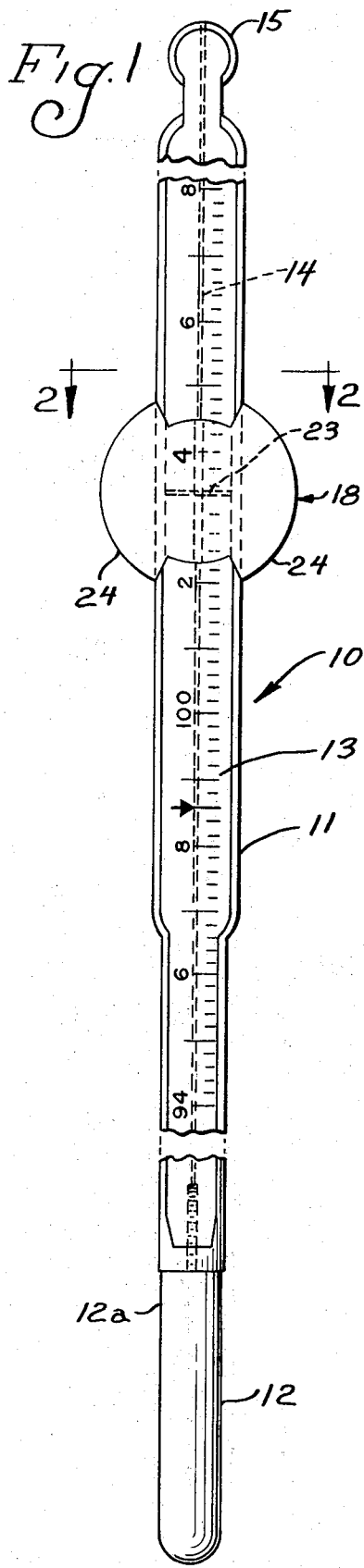
FIG. 1 is a broken front elevation of a thermometer having a readout means embodying the invention.

In the exemplary embodiment of the invention as shown in the drawing, a thermometer generally designated 10 is shown to comprise a clinical thermometer having a stem 11 and a reservoir bulb 12. The stem is provided with an indicator scale 13 for indicating the top of the column of a body of indicating liquid extending upwardly from the bulb 12 through an axial capillary bore 14 in the stem. In the illustrated embodiment, the stem is formed of a molded plastic and the capillary bore may open through the outer end 15 of the stem.

Bulb 12 is secured to a lower cylindrical extension 16 of the stem by a telescopic force fit of the top portion 12a of the bulb thereover forming an effective positive sealed connection of the bulb to the stem.

Figure 3:
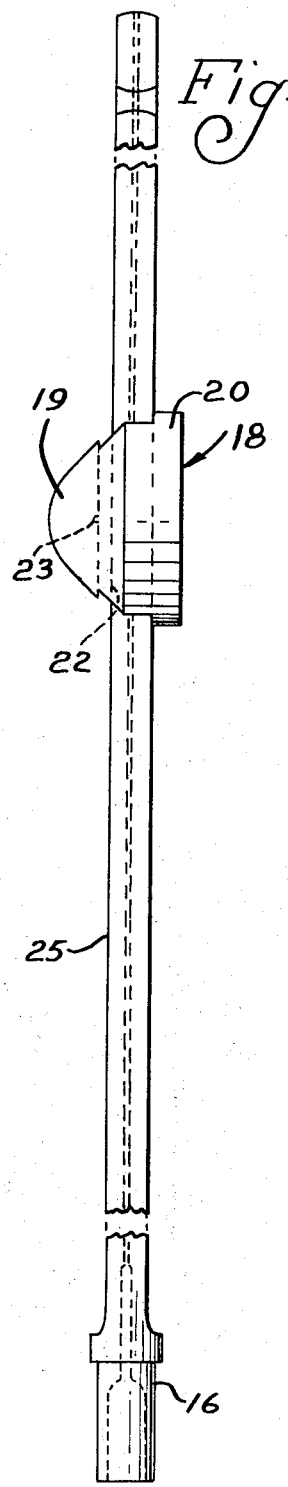
FIG. 3 is a fragmentary side elevation of the assembled stem and readout means prior to the provision of the bulb and indicator liquid in association therewith.

As indicated above, the present invention comprehends an improved readout means for use in association with the scale 13 and providing a retained indication of the sensed temperature. As shown, the readout means generally designated 18 comprises a slide element on the stem having a convex manipulating portion 19 and a pair of inturned flange portions 20 and 21 co-operatively slidably embracing the stem in a slot 22. The readout means may comprise a molded element formed of a resilient synthetic plastic, such as Lucite, polystyrene, etc. The slot 22 is preselected to provide a slight interference fit whereby the element 18 is frictionally retained on the stem while yet permitting manual movement thereof on the stem to a desired adjusted position. As shown in FIG. 3, the slot 22 may extend partially into the manipulating portion 19. As will be obvious to those skilled in the art, in lieu of the integral molded construction of the readout element 18, the inturned flanges 20 and 21 may be formed separately as of spring metal and secured to the manipulating portion 19. Further, if desired, the element 18 may be formed of a relatively rigid material, such as glass, with the resiliency of the plastic stem providing the desired frictional retention of the interference fit.

In the illustrated embodiment, the manipulating portion 19 is spherical and the inturned flange portions 20 and 21 are segmentally cylindrical. The use of the spherical manipulating portion 19 permits the manipulating portion to further define a magnifying means for magnifying the scale 13 and the top of the indicator liquid column aligned with the center of the manipulating portion 19. To facilitate accurate disposition of the readout element 18 with the top of the liquid column, a reference line 23 may be provided on the underside of the manipulating portion 19. The reference line may be provided in any suitable form as by molding the line as a slight recess or projection therein, or by scribing, painting, stamping, etc.

In use, the bulb portion 12 of the thermometer is inserted in the patient's body orifice. As the capillary bore 14 is effectively unrestricted, rapid rising of the indicator liquid column to indicate the sensed temperature is effected. Reading of the temperature is facilitated by the user sliding the readout element 18 along the stem to align the reference line 23 with the top of the indicator liquid column. Frictional forces of the readout element 18 acting longitudinally outwardly along the stem when the element 18 is so urged are prevented from causing separation of the bulb from the stem portion 16 by the positive sealed association of the bulb and stem. The magnifying characteristics of the manipulating portion 19 permits facilitated accurate alignment of the reference line 23 with the top of the liquid column.

The thermometer may then be removed from the patient's body orifice. The element 18 thereupon provides a retained indication of the sensed temperature notwithstanding contraction of the indicator liquid by the cooling of the thermometer which, because of the substantially unrestricted capillary bore arrangement, may effect a rapid lowering of the top of the indicator liquid column. The magnifying action of the manipulating portion 19 further facilitates reading of the scale means aligned with the reference line 23 for improved accuracy in the temperature determination.

In the illustrated embodiment, the manipulating portion 19 of the element 18 provides an enlargement of the viewed scale and liquid column top of approximately two to one, thus substantially increasing the ease of use of the thermometer. As the element 18 is adjustable, the thermometer may be reused repeatedly with the element 18 being readjusted to correspond to the indicator liquid column top during each such use. Alternatively, as the thermometer stem may be formed of low cost synthetic plastic, readout element 18 may similarly be formed of inexpensive molded synthetic plastic, and the bulb formed of inexpensive aluminum, the thermometer effectively is disposable and, thus, is adapted for one-time use as well as such reuse as discussed above.

The readout element 18, thusly, is slidably mounted to the thermometer stem in such a manner as to be nonrotatably mounted thereon whereby the magnifying lens 19 is accurately centered relative to the scale means 13 and the capillary bore 14 in each of the longitudinally adjusted positions. As the center of the magnifying lens projection 19 is aligned with the center of the capillary bore 14, maximum magnification of the relatively small liquid column top is provided. Further, as the magnifying lens is centered relative to the scale 13, effectively minimum distortion of the scale in the magnification thereof is obtained.

Figure 2:
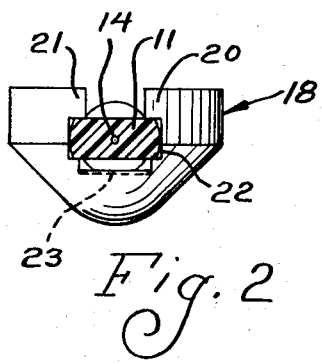
FIG. 2 is a transverse section taken substantially along the line 2—2 of FIG. 1.
Figure 4:
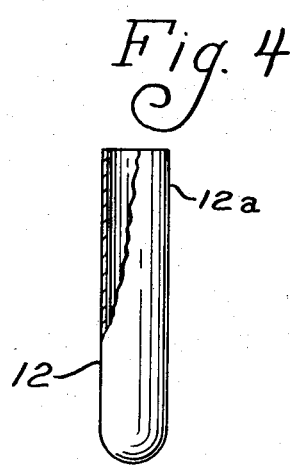
FIG. 4 is a side elevation of the bulb prior to the installation thereof on the thermometer stem.

Augmenting the fingertip manipulating means 19, the base flange portion 20 of element 18 is caused to extend substantially laterally of the stem 11, as best seen in FIGS. 1 and 2. More specifically, as shown therein, the lateral extent of the slide element 18 may be approximately twice the extent of the stem laterally of the scale means 13 and may be defined by arcuate lateral side edges 24 cooperating with the convex configuration of the protuberance 19 to permit manipulation of the element 18 in both directions by engagement of the user's fingers with rounded portions of the element. In the illustrated embodiment, the stem is flattened laterally so as to have effectively a rectangular cross section, as shown in FIG. 2. Thus, the scale means 13 on the front relatively wide flat base 25 of the stem 11 may be made relatively large for facilitated readout. The indicator line 23 effectively extends the full width of the front face 25 for further facilitating readout of the sensed temperature.

The foregoing disclosure of specific embodiments is illustrative of the broad inventive concepts comprehended by the invention.

We claim:

1. In a thermometer having a reservoir bulb defining an insertion portion to be inserted into a body orifice and a stem formed of resilient material defining a reading portion substantially rectangular in transverse cross section exposed exteriorly of the body orifice when said insert portion is inserted thereinto, said bulb being sealingly fitted to one end of said stem, said stem defining a capillary bore opening to said reservoir bulb, indicator liquid in the reservoir bulb and defining a column extending into said capillary bore responsive to temperature changes to provide a variable positioning of the top of the column, and scale means on the stem reading portion, readout means providing a maintained location indication of said column top corresponding to a reading temperature notwithstanding a subsequent lowering of said column top therefrom due to subjecting the thermometer to a temperature lower than the reading temperature prior to effecting the reading of the thermometer, said readout means comprises a molded plastic flanged element partially surrounding the stem and having a reference indicator and being readily adjustably positionable on the stem reading portion to align said reference indicator accurately with said column top while said insert portion of the stem is retained in the body orifice, said element having a mounting slot complementary to said stem reading portion providing a sliding frictional fit of said element on said stem reading portion, said element further having a convex protuberance for facilitated fingertip manipulation thereof in effecting the adjustable positioning on said stem, said protuberance defining a magnifying lens providing a magnified image of said reference indicator, said column top, and said scale, the resiliency of the stem serving to maintain said element in the adjusted position to provide a maintained indication of the sensed temperature notwithstanding a subsequent change in the position of said column top upon removal of the insert portion from the body orifice.

2. The thermometer readout means of claim 1 wherein said readout element comprises a transparent element.

3. The thermometer readout means of claim 1 wherein said bulb is formed of a metal.

4. The thermometer readout means of claim 1 wherein said reference indicator means defines a two-to-one magnifying lens providing a magnified image of said reference indication and said column top.

5. The thermometer readout means of claim 1 wherein said readout element has a lateral extent approximately twice the extent of said stem laterally of the scale means.

6. The thermometer readout means of claim 1 wherein the lateral side edges of said readout element are arcuate.

7. In a thermometer having a reservoir bulb defining an insertion portion to be inserted into a body orifice and a stem formed of a molded plastic defining a reading portion exposed exteriorly of the body orifice when said insert portion is inserted thereinto, said bulb being sealingly fitted to one end of said stem, said stem defining a capillary bore opening to said reservoir bulb at one end of the stem and opening outwardly through the opposite end of the stem, indicator liquid in the reservoir bulb and defining a column extending into said capillary bore responsive to temperature changes to provide a variable positioning of the top of the column in said capillary bore, and scale means on the stem reading portion, readout means providing a maintained location indication of said column top corresponding to a reading temperature notwithstanding a subsequent lowering of said column top therefrom due to subjecting the thermometer to a temperature lower than the reading temperature prior to effecting the reading of the thermometer, said readout means comprising a molded plastic element having a reference indicator and being readily adjustably positionable on the stem reading portion to align said reference indicator accurately with said column top while said insert portion of the stem is retained in the body orifice, said element having inturned flange portions embracing the stem in a sliding frictional fit on said stem reading portion, said element further defining a magnifying lens providing a magnified image of said reference indicator, said column top, and said scale, said frictional fit maintaining said element in the adjusted position to provide a maintained indication of the sensed temperature notwithstanding a subsequent change in the position of said column top upon removal of the insert portion from the body orifice.

8. The thermometer readout means of claim 7 wherein said readout element comprises a transparent element.

9. The thermometer readout means of claim 7, wherein said bulb is formed of a metal.

10. The thermometer readout means of claim 7 wherein said reference indicator means defines a two-to-one magnifying lens providing a magnified image of said reference indication and said column top.

11. The thermometer readout means of claim 7 wherein said readout element has a lateral extent approximately twice the extent of said stem laterally of the scale means.

12. The thermometer readout means of claim 7 wherein the lateral side edges of said readout element are arcuate.

13. The thermometer readout means of claim 7 wherein said magnifying lens defines a convex protuberance means for facilitated fingertip manipulation of said element in effecting the adjustable positioning thereof on said stem.

* * * * *